(12) United States Patent
Bech

(10) Patent No.: US 8,403,786 B2
(45) Date of Patent: Mar. 26, 2013

(54) WIND TURBINE WITH A DRIVE TRAIN

(75) Inventor: Anton Bech, Ringkøbing (DK)

(73) Assignee: Vestas Wind Systems A/S, Aarhus N (DK)

( * ) Notice: Subject to any disclaimer, the term of this patent is extended or adjusted under 35 U.S.C. 154(b) by 738 days.

(21) Appl. No.: 12/512,785

(22) Filed: Jul. 30, 2009

(65) Prior Publication Data

US 2009/0289460 A1    Nov. 26, 2009

(30) Foreign Application Priority Data

Jan. 31, 2007    (DK) .......................... 2007 000048 U

(51) Int. Cl.
F16H 3/72 (2006.01)

(52) U.S. Cl. .......................................................... 475/5

(58) Field of Classification Search .................. 475/330, 475/348, 339; 384/456, 490, 495
See application file for complete search history.

(56) References Cited

U.S. PATENT DOCUMENTS

| 2,789,021 | A | * | 4/1957 | Pedersen .................... 384/461 |
| 5,295,922 | A | * | 3/1994 | Amborn et al. ............... 475/248 |
| 5,663,600 | A | | 9/1997 | Baek et al. |
| 7,828,682 | B2 | * | 11/2010 | Smook ............................... 475/5 |
| 7,935,020 | B2 | * | 5/2011 | Jansen et al. .................. 475/338 |
| 2003/0086631 | A1 | | 5/2003 | Faltus et al. |
| 2003/0125158 | A1 | * | 7/2003 | Flamang ........................ 475/331 |
| 2004/0038770 | A1 | * | 2/2004 | Flamang et al. .............. 475/348 |
| 2006/0205561 | A1 | * | 9/2006 | Flamang et al. .............. 475/348 |

FOREIGN PATENT DOCUMENTS

| CN | 2649869 Y | 10/2004 |
| DE | 10318945 B3 | 10/2004 |
| GB | 2395529 A | 5/2004 |
| WO | 9119916 A1 | 12/1991 |

OTHER PUBLICATIONS

International Preliminary Report on Patentability; PCT/DK2007/000048; Apr. 22, 2009; 11 pages.
International Search Report; PCT/DK2007/00048; Nov. 14, 2007; 3 pages.

* cited by examiner

*Primary Examiner* — David D Le
*Assistant Examiner* — David J Hlavka
(74) *Attorney, Agent, or Firm* — Wood, Herron & Evans, LLP

(57) ABSTRACT

A wind turbine with a drive train placed partly or entirely in a nacelle of the wind turbine is provided. The drive train includes an epicyclical gearbox including at least one gear stage having a plurality of planet gears meshing with a sun gear and an annulus gear. The gearbox is used to transfer and speed-up the rotation of a rotor of the wind turbine, as applied to at least one generator of the wind turbine. The drive train further includes at least one locally radial self tracking bearing for enabling the rotation of the rotor in relation to a nacelle structure of the nacelle. The self tracking bearing includes bearing elements for locally transferring loads in both radial directions between one or more bearing rings.

16 Claims, 10 Drawing Sheets

WIND TURBINE WITH A DRIVE TRAIN

CROSS-REFERENCE TO RELATED APPLICATIONS

The present application is a continuation of pending International patent application PCT/DK2007/000048 filed on Jan. 31, 2007 which designates the United States, the content of which is incorporated herein by reference.

FIELD OF THE INVENTION

The invention relates to a wind turbine with a drive train placed partly or entirely in a nacelle of the wind turbine.

BACKGROUND OF THE INVENTION

A wind turbine known in the art comprises a wind turbine tower and a wind turbine nacelle positioned on top of the tower. A wind turbine rotor with a number of wind turbine blades is connected to the nacelle through a low speed shaft, as illustrated on FIG. 1.

As modern wind turbines get bigger and bigger, both in size and in output, the demand for more efficient wind turbine components is increased. But as the components of, for example, the drive train of the wind turbine get bigger, it becomes increasingly difficult and costly to ensure the rigidity of the drive train.

Furthermore, large modern wind turbines—in particular turbines above 1 MW—have slow turning rotors and the rotation speed is generally lower the larger the rotor diameter is. This is in disfavour for the energy converting system.

On the current MW wind turbines most gearboxes have a planetary gear as a first stage and the following stages are either planetary or helical gears. The first stage planetary gears have most commonly 3 planets of relatively large diameter and a sun gear of a relatively small diameter.

An example of this is disclosed in PCT application no. WO 91/19916, wherein a main shaft of a wind turbine is provided with two main bearings and an epicyclical gearbox comprising at least two gear stages. One of the downsides of this drive train design is that to ensure that all the components are in their right place at all times, all components have to be rigidly fixed in relation to each other. This demands a rigid, heavy and expensive construction.

An object of the invention is to provide for a wind turbine with a drive train which is more cost and weight efficient.

SUMMARY OF THE INVENTION

The invention provides for a wind turbine with a drive train placed partly or entirely in a nacelle of the wind turbine. The drive train comprises an epicyclical gearbox including at least one gear stage comprising a plurality of planet gears meshing with a sun gear and/or an annulus gear. The gearbox partly or completely speed-up the rotation speed of a rotor of the wind turbine to at least one generator of the wind turbine. The wind turbine is characterized in that the drive train further comprises at least one locally radial self tracking bearing for enabling the rotation of the rotor in relation to a nacelle structure of the nacelle.

Combining at least one locally radial self tracking bearing with an epicyclical gearbox in the drive train of a wind turbine is advantageous in that this combination allows for a more flexible design of the drive train.

The larger the wind turbine is, the larger the components of the drive train have to be. The larger the components of the drive train are, the larger and more rigid the internal strengthening structure of the different drive train components has to be, and the larger and more rigid the external strengthening structure—fixating the different drive train components in relation to each other—has to be.

An epicyclical gearbox is by its nature to a certain degree capable of accepting radial deflection of the gears, but traditional bearings provided in the drive train for enabling the rotation of the rotor in relation to the stationary parts of the drive train—such as the stator part of the generator, the nacelle structure or other—do not accept large local radial loads on only one of the rings because of their inherent demand for rigidity. In other words, a traditional two ring ball bearing will have to transfer a large local radial load on one side of the inner ring to the other side of the inner ring to withstand the load. This transferring of loads demands that the ring be very rigid and inflexible.

By providing the bearing or bearings with means for locally adapting to any radial movement, for example, caused by large radial loads, it is possible to completely eliminate or at least severely reduce the external strengthening structure of the nacelle, thereby reducing the weight and the cost of the drive train.

It should be emphasized that by the term "locally" is to be understood that the load is transferred substantially where it is applied. For example, if the inner ring of a traditional two ring ball bearing is subject to a radial load towards the axis of rotation of the bearing, the only thing preventing the inner and outer ring from being separated is that the inner ring on the opposite side of the bearing will press against the outer ring (via the balls). This load transferring is not local in that the load is transferred on opposite sides of the bearing.

Furthermore, it should be emphasized that by the term "self tracking" is to be understood that the bearing is substantially self-guiding, in other words, it does substantially not need rigidity of the structure to which it is attached to operate properly.

In an aspect of the invention, the locally radial self tracking bearing comprises a device for locally transferring loads in both radial directions between one or more bearing rings directly or indirectly connected to rotor and one or more bearing rings directly or indirectly connected to the nacelle structure.

This is advantageous in that the demand for rigidity of the parts to which the bearing rings are attached can be reduced.

It should be emphasized that by the term "both radial directions" is to be understood both directions substantially perpendicularly toward and from the bearings axis of rotation.

In an aspect of the invention, the pitch diameter of said sun gear is bigger than between 30% and 99%, preferably between 50% and 95% and most preferred between 70% and 90% such as 80% of the pitch diameter of said annulus gear.

If the sun gear is too big in relation to the annulus ratio of the gearbox becomes too small. If the sun gear is too small in relation to the annulus, the ratio or the planet gears has to be relatively big and there is therefore only room for a relatively small number of planets. The present size relation ranges therefore provide for an advantageous relation between high gear ratio and low load on each planet.

In an aspect of the invention, at least one gear stage comprises between 2 and 100, preferably between 4 and 60 and most preferred between 9 and 40, such as 24 planet gears.

If the number of planets is too high, the gearbox becomes too complex and expensive to manufacture. If the number of planets is too small, each planet has to transfer a relatively high load. The present ranges of the number of planet gears therefore provides for an advantageous relation between cost and efficiency.

In an aspect of the invention, the gearbox comprises at least two gear stages.

A gearbox with a large number of relatively small planet gears will have a relatively low gear ratio and it is therefore advantageous to provide the gearbox with at least two gear stages to increase the overall gear ratio of the gearbox.

In an aspect of the invention, one or more of the planet gears comprises a first toothed part having a first pitch diameter and a second toothed part having a second pitch diameter and wherein the first pitch diameter is different from the second pitch diameter.

By providing the planets with two different toothed diameters it is possible to increase the gear ratio of the individual gear stage in that if the two different toothed diameters mesh with different parts of the gearbox the relation between the two different toothed diameters will provide extra gearing to the stage.

In an aspect of the invention, the first toothed part of the planet gears meshes with the annulus gear.

Hereby is achieved an advantageous embodiment of the invention.

In an aspect of the invention, the second toothed part of the planet gears meshes with the sun gear.

Hereby is achieved an advantageous embodiment of the invention.

In an aspect of the invention, the second pitch diameter of the planet gears is bigger than the first pitch diameter of the planet gears.

Hereby is achieved an advantageous embodiment of the invention.

In an aspect of the invention, at least one locally radial self tracking bearing is a main bearing of the wind turbine.

The main bearing of a wind turbine is subject to many different kinds of loads such as moments, torsion, self-weight, push-pull and other loads acting from different directions. It is therefore advantageous that the main bearing is a locally radial self tracking bearing in that this type of bearing is better at handling these loads.

It should be emphasized that the term "main bearing" is to be understood as the bearing or bearings transferring the bulk of the load of the rotor to the rest of the wind turbine while at the same time allowing that the rotor can rotate in relation to the nacelle. "The load of the rotor" could be the weight of the rotor, the axial wind load, moment originating from differences in wind load over the rotor plane and/or other loads.

In an aspect of the invention, at least one locally radial self tracking bearing is integrated in or directly connected to the epicyclical gearbox.

By integrating or directly connecting the parts, it is possible to design a simpler and more efficient drive train.

In an aspect of the invention, the annulus ring is divided into two or more segments.

A full undivided ring can only be removed radially radial if it can pass unobstructed through the centre. It would be difficult and expensive to design a gearbox or a drive train where this would be possible and it is therefore advantageous that segments of the ring can be removed independently in a radial direction.

In an aspect of the invention, at least one generator comprise at least one rotor part rotating in relation to the nacelle structure and at least one stator part being substantially stationary in relation to the nacelle structure during normal operation of the wind turbine.

Hereby is obtained an advantageous embodiment of a wind turbine generator.

In an aspect of the invention, at least one rotor part substantially encloses at least one stator part.

Making the rotor part rotate around the stator part is advantageous in that it hereby is possible to design a very compact drive train where the generator could substantially be fitted inside the gearbox.

In an aspect of the invention, at least one stator part substantially encloses at least one rotor part.

Making the rotor rotate inside the stator is advantageous in that it enables a hollow generator and thereby a hollow drive train.

In an aspect of the invention, the drive train further comprises at least one generator.

Hereby is achieved an advantageous embodiment of the invention.

In an aspect of the invention, the drive train comprises two or more separate generators.

Providing the drive train with more than one generator is advantageous in that the individual generators are easier to handle than one large generator and in that it hereby is possible to provide the wind turbine with redundancy regarding power production.

In an aspect of the invention, the drive train comprise a hollow centre through the entire drive train along the axis of rotation.

This is advantageous in that a pipe shaped drive train provides for a strong structure and in that a hollow drive train enables that the different drive train components can be serviced, accessed, inspected and other from the inside and the outside.

In an aspect of the invention, the hollow centre is of a size that it provides personnel access through the entire drive train.

Access to and from the hub of a wind turbine is typically a problem that is difficult to overcome. By providing a hollow center through the entire drive train of a size enabling that a grown person could pass through it would, in a simple and inexpensive way, provide access to the rotor of the wind turbine. The hollow center should be of at least 1 meter in diameter for a grown person to be able to pass substantially easily.

In an aspect of the invention, the locally radial self tracking bearing comprises at least one outer ring, at least one centre ring and at least one inner ring and wherein the centre ring is capable of rotation in relation to the outer ring and the inner ring or the outer ring and the inner ring are capable of rotation in relation to the centre ring.

A locally radial self tracking bearing where a centre ring is capable of rotation between an outer and an inner ring is advantageous for the operation of the wind turbine because the bearing is more efficient in transferring radial loads in both radial directions.

In an aspect of the invention, at least one outer ring and at least one inner ring are rigidly connected.

For example, if the outer ring is rigidly connected to the rotor and the centre ring is connected to the nacelle, the load from gravity acting on the rotor will pull the outer ring down against the centre ring at the top part of the bearing. This great radial load is transferred to the nacelle through the centre ring but it will also try to pull the inner ring away from the centre ring hereby increasing the risk of the locally radial self tracking bearing being damaged. If the inner ring and the outer ring are rigidly connected the distance between the inner surface of the outer ring and the outer surface of the inner ring is maintained substantially constant at all times, whereby reducing the risk of malfunction or damage.

Furthermore, if the outer ring and the inner ring are rigidly connected the abovementioned load will be transferred by the outer ring at the top and by the inner ring at the bottom substantially without the outer ring and the inner ring being mutually displaced, hereby enabling that even though this load would force the rings into a slightly oval shape the bearing is still self-tracking, in that the centre ring is substantially rigidly guided by the outer ring and the inner ring and the locally radial self tracking bearing is thereby less dependent on rigidity of the surrounding structure to which it is attached or integrated.

It should be emphasized that the term "rigidly connected" is to be understood as the at least one outer ring and the at least one inner ring being substantially inflexibly fixed in relation to each other, in other words, neither of the rings can rotate or move radially or axially in relation to the other.

In an aspect of the invention, at least one outer ring and at least one inner ring are attached to a hub of the rotor.

Hereby is enabled an advantageous design regarding the transferring of the loads from the rotor to the nacelle.

In an aspect of the invention, at least one centre ring is directly or indirectly attached to the annulus gear of the epicyclical gearbox.

Connecting the centre ring directly or indirectly to the annulus gear is advantageous in that it provides for a simple and inexpensive drive train design.

In an aspect of the invention, the locally radial self tracking bearing and/or the epicyclical gearbox comprises a device for allowing the outer ring or at least a part of the outer ring to be displaced axially.

By enabling the outer ring or a part of the outer ring to be axially displaced, access to the internal parts between the outer ring and the centre ring is enabled. This is advantageous in that damage or wear to the internal parts becomes easier to repair.

The internal parts could, for example, comprise one or more rows of rolling elements, one or more cages for guiding the rolling elements and/or one or more raceways.

In an aspect of the invention, the locally radial self tracking bearing and/or the epicyclical gearbox comprises a device for allowing the inner ring or at least a part of the inner ring to be displaced axially.

By enabling the inner ring or a part of the inner ring to be axially displaced, access to the internal parts between the inner ring and the centre ring is enabled. This is advantageous in that damage or wear to the internal parts becomes easier to repair.

In an aspect of the invention, at least one outer ring and/or at least one inner ring and/or a part of at least one outer ring and/or a part of at least one inner ring are divided into two or more segments.

Dividing the rings or parts of the rings into two or more segments is advantageous in that the rings hereby are easier to dismantle.

In an aspect of the invention, the locally radial self tracking bearing comprises at least one row of rolling elements between at least one outer ring and at least one centre ring and at least one row of rolling elements between at least one inner ring and at least one centre ring.

Rolling elements between the rings are an advantageous way of providing for a low-friction rotating joint.

In an aspect of the invention, the rolling elements in the rows are maintained separated by one or more cages.

Hereby is provided for an advantageous embodiment of the invention in that the rolling elements in a row are prevented from rubbing against each other and in that the load-transmitting contact surfaces are maintained evenly distributed around the entire bearing rings.

In an aspect of the invention, one or more of the cages are divided into one or more segments.

To enable that the cages can be dismantled on-site, it is advantageous that the cages are divided into one or more segments.

It should be emphasized that by the term "segment" is to be understood that the cage is divided into one or more parts divided by one or more cuts in the axial plane parallel with the rotational axis of the main bearing unit.

That the cage can be divided into one segment means that the full-circle cage ring is open in one place.

In an aspect of the invention, at least one outer ring and/or at least one inner ring comprise one or more separate raceways.

The raceway is the part of the bearing rings that comprise the surface on which the rolling elements roll during normal operation of the bearing. This contact surface between the rings and the rolling elements is highly strained because a large load has to be transferred through the relatively small contact surface, and it is therefore advantageous to make the raceway a separate part from the rest of the ring to enable that only the raceway and not the entire ring would have to be replaced in case of wear, damage or other reasons.

Furthermore, it should be emphasized that by the term "separate" is to be understood that the raceway is a separate part, which can be detached from the ring. The raceway or raceway parts are mounted in or at least to some degree fixated by the bearing ring, but it is not formed integrally with the ring and can therefore, for example, be made from a different material.

In an aspect of the invention, at least one centre ring comprises one or more separate raceways.

Hereby is achieved an advantageous embodiment of the invention.

In an aspect of the invention, one or more of the separate raceways are divided into segments.

Hereby is easier dismantling of the raceways enabled.

In an aspect of the invention, at least one centre ring is connected to a stator part of at least one generator.

Connecting the centre ring directly or indirectly to the stator part of the generator is advantageous in that it provides for a simple and inexpensive drive train design.

BRIEF DESCRIPTION OF THE DRAWINGS

The invention will be described in the following with reference to the figures in which.

DETAILED DESCRIPTION OF THE INVENTION

Figure 1:
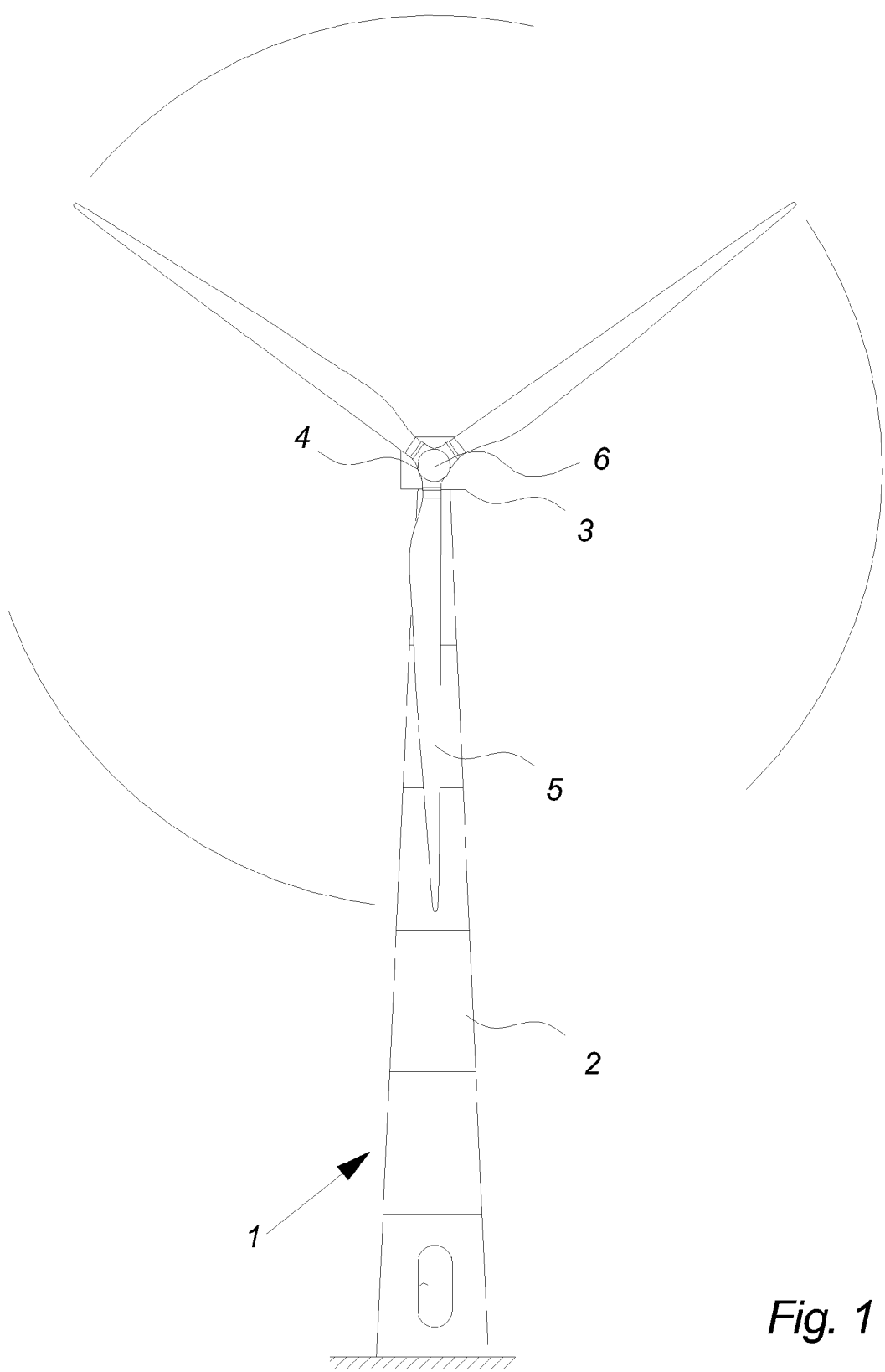
FIG. 1. illustrates a large modern wind turbine as seen from the front.

FIG. 1 illustrates a wind turbine 1, comprising a tower 2 and a wind turbine nacelle 3 positioned on top of the tower 2. The wind turbine rotor 4, comprising three wind turbine blades 5 mounted on a hub 6, is connected to the nacelle 3 through the low speed shaft which extends out of the nacelle 3 front.

In another embodiment the wind turbine rotor 4 could comprise another number of blades 5 such as one, two or four.

Figure 2:
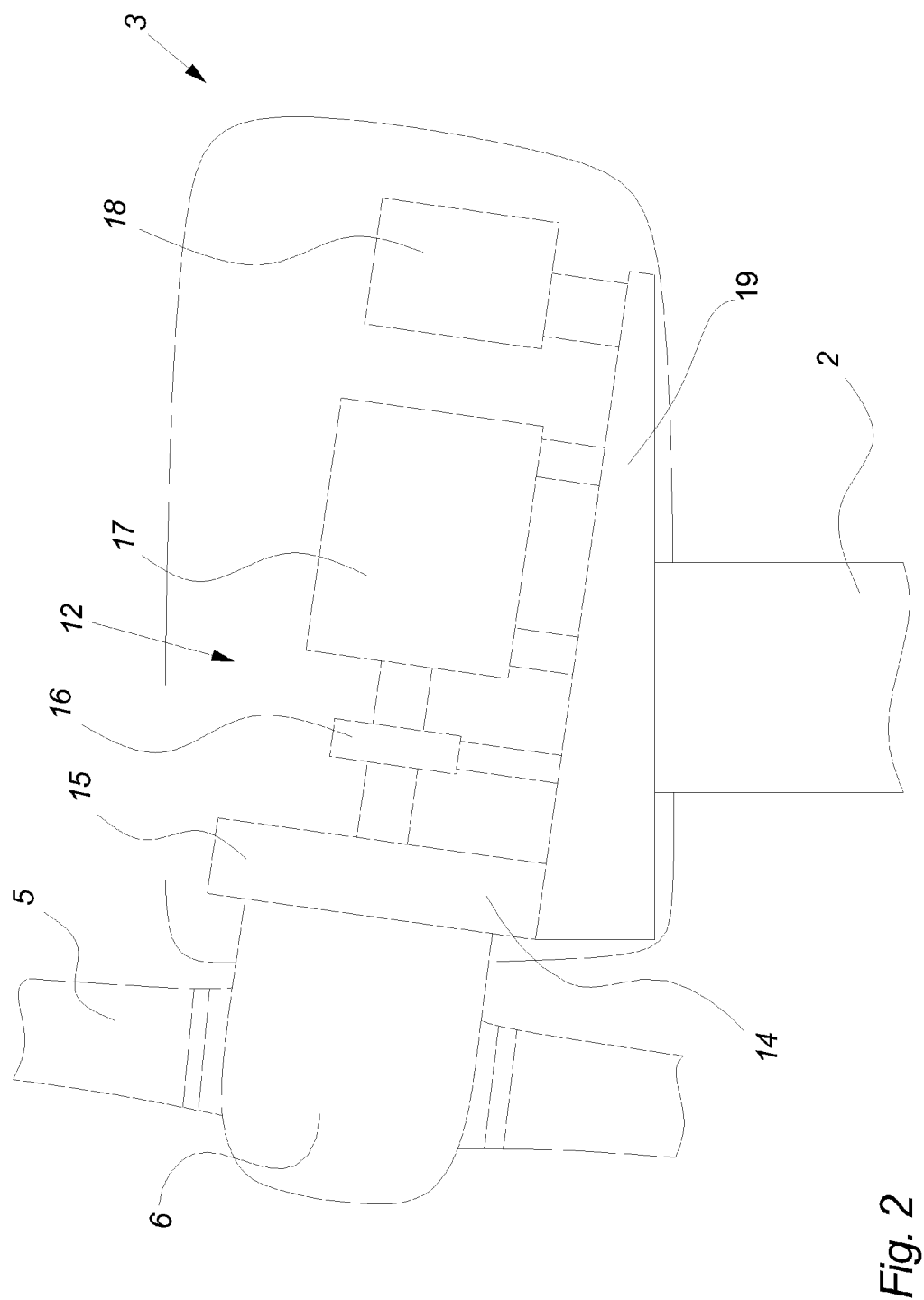
FIG. 2 illustrates a cross section of an embodiment of simplified nacelle known in the art, as seen from the side.

FIG. 2 illustrates a simplified cross section of a nacelle 3 of a prior art wind turbine 1, as seen from the side. Nacelles 3 exists in a multitude of variations and configurations but in most cases the drive train 12 in the nacelle 3 almost always comprise one or more of the following components: a gearbox 15 (typically a epicyclical gearbox), a coupling (not shown), some sort of braking system 16 and a generator 17. A nacelle 3 of a modern wind turbine 1 can also include a converter 18 (also called an inverter) and additional peripheral equipment such as further power handling equipment, control cabinets, hydraulic systems, cooling systems and more.

The weight of the entire nacelle 3 including the nacelle components 15, 16, 17, 18 is carried by a nacelle structure 19. The components 15, 16, 17, 18 are usually placed on and/or connected to this common load carrying nacelle structure 19. In this simplified embodiment the load carrying nacelle structure 19 only extends along the bottom of the nacelle 3 e.g. in form of a bed frame to which some or all the components 15, 16, 17, 18 are connected. In another embodiment the load carrying structure 19 could comprise a gear bell which through the main bearing 14 could transfer the load of the rotor 4 to the tower 2, or the load carrying structure 19 could comprise several interconnected parts such as latticework.

The nacelle further comprise a main bearing 14 for ensuring that the rotor 4 can rotate substantially freely in relation to the nacelle structure 19 and the fixed drive train parts 15, 16, 17, 18 of the nacelle 3. In this embodiment the of a drive train 12 the main bearing 14 is integrated in the gearbox 15 in that the rotor 4 is connected directly to the gearbox 15 via the hub 6. Because the main bearing 14 is incorporated in the gearbox 15, the gearbox structure has to be able to transfer the entire load of the rotor 4 to the tower 2 by means of the nacelle strengthening structure 19.

Figure 3:
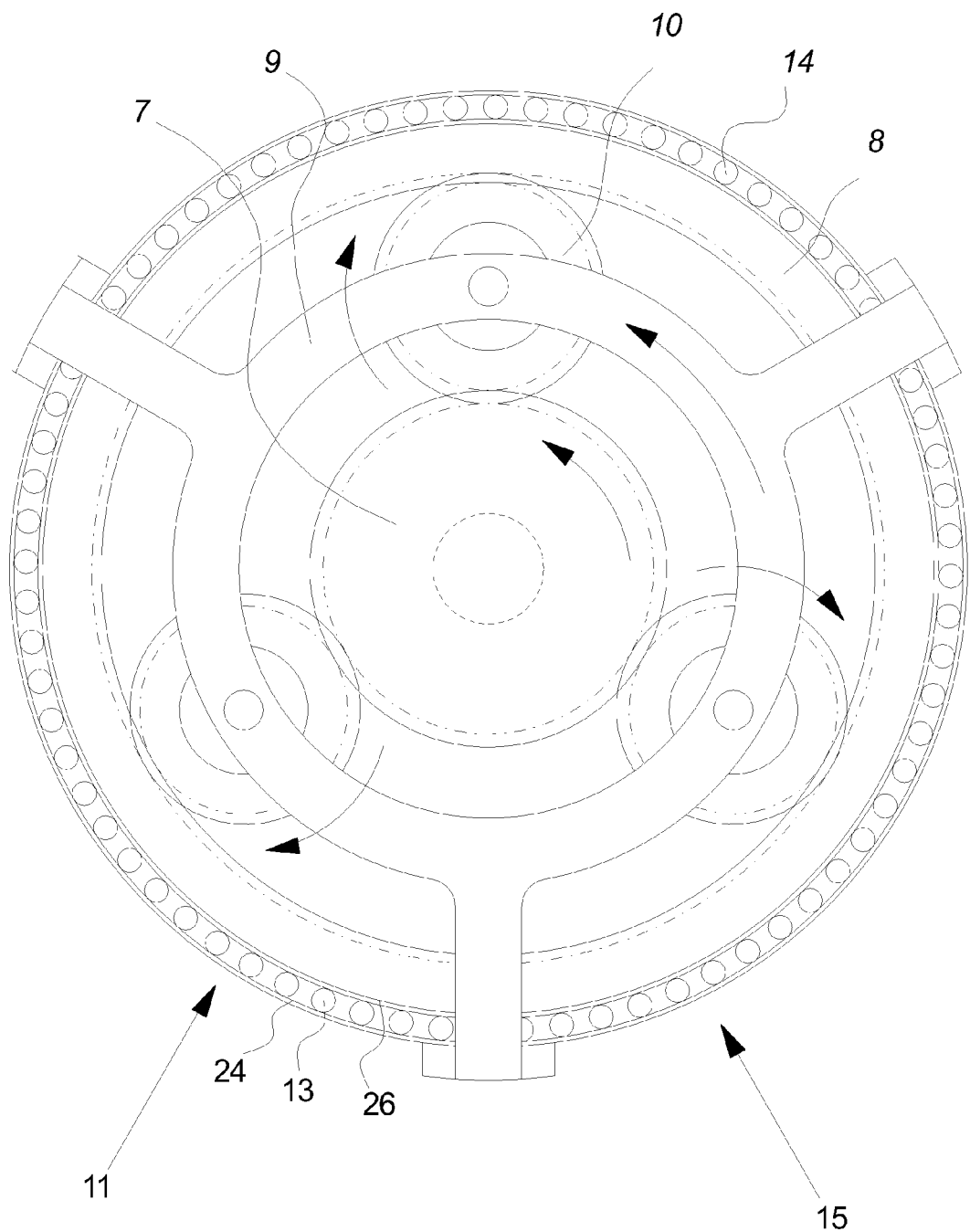
FIG. 3 illustrates an embodiment of an epicyclical gearbox as known in the art, as seen from the front.

FIG. 3 illustrates an embodiment of a prior art epicyclical gearbox 15, as seen from the front.

In this embodiment of an epicyclical gearbox 15, the planet gears 10 meshes with and rotates around a sun gear 7 in the middle. The planet gears 10 further meshes with an outer annulus gear 8. The arrows indicate that the planet gears 10 all rotate in the same direction and that the sun gear 7 rotates in the opposite direction.

In this embodiment the wind turbine rotor 4 is connected to a planet carrier 9 in that the outer peripheral part (not shown) of the hub 6 is connected to the planet carrier 9 at a relatively large diameter.

In another embodiment the rotor 4 could also be connected to the gearbox 15 by means of a low speed shaft or other.

The planet carrier 9 connects the planet gears 10 by fixating the planet gear shafts to the common planet carrier structure 9.

Typically the annulus gear 8 is connected to a carrying frame, to the gearbox housing or is in other ways fixed, but in some epicyclical gearboxes 15 types, the annulus gear 8 could also rotate.

Furthermore, the illustrated gears show only one stage 11 of a gearbox 15. The entire gearbox 15 could comprise a number of stages 11 as the one shown to increase the gearing, or it could comprise a number of different stages 11 e.g. a first stage where the sun gear 7 is missing and the rotor 4 rotates the annulus gear 8, which mesh with a number of planet gears 10. The planet gears 10 of the first stages 11 is then connected to planet gears 10 of a larger size in a second stage 11, which mesh with a sun gear 7, which is connected to the output shaft of the gearbox 15. Other gearbox 15 designs are also feasible often depending on what type of wind turbine 1 the gearbox 15 is to be used in.

In this embodiment the planet carrier 9 is formed as a structure connecting the three planet gears 10. The carrier 9 further comprises arms for connecting the carrier 9 to the main bearing 14. When the rotor 4 is connected directly to the carrier 9 the planet carrier 9 also has to transfer the entire load of the rotor 4 to the load carrying nacelle structure 19. The inner ring 26 of a large diameter main bearing 14 is therefore mounted on the outside of the annulus gear 8 and the outer ring 24 of the main bearing 14 is connected to the planet carrier 9, which extends beyond the annulus gear 14. The main bearing 14 is hereby integrated in the gearbox 15.

In another embodiment a more or less circular planet carrier 9 could be provided with a main bearing 14 around its outer perimeter, where the outer ring of the main bearing 14 was connected to the annulus gear 8, the gearbox housing or in other ways fixed.

In a further embodiment the epicyclical gearbox 15 would be separate from the main bearing 14 e.g. if a low speed shaft from the rotor 4 were provided with one or more main bearings 14 before the shaft was connected to the gearbox 15.

Figure 4:
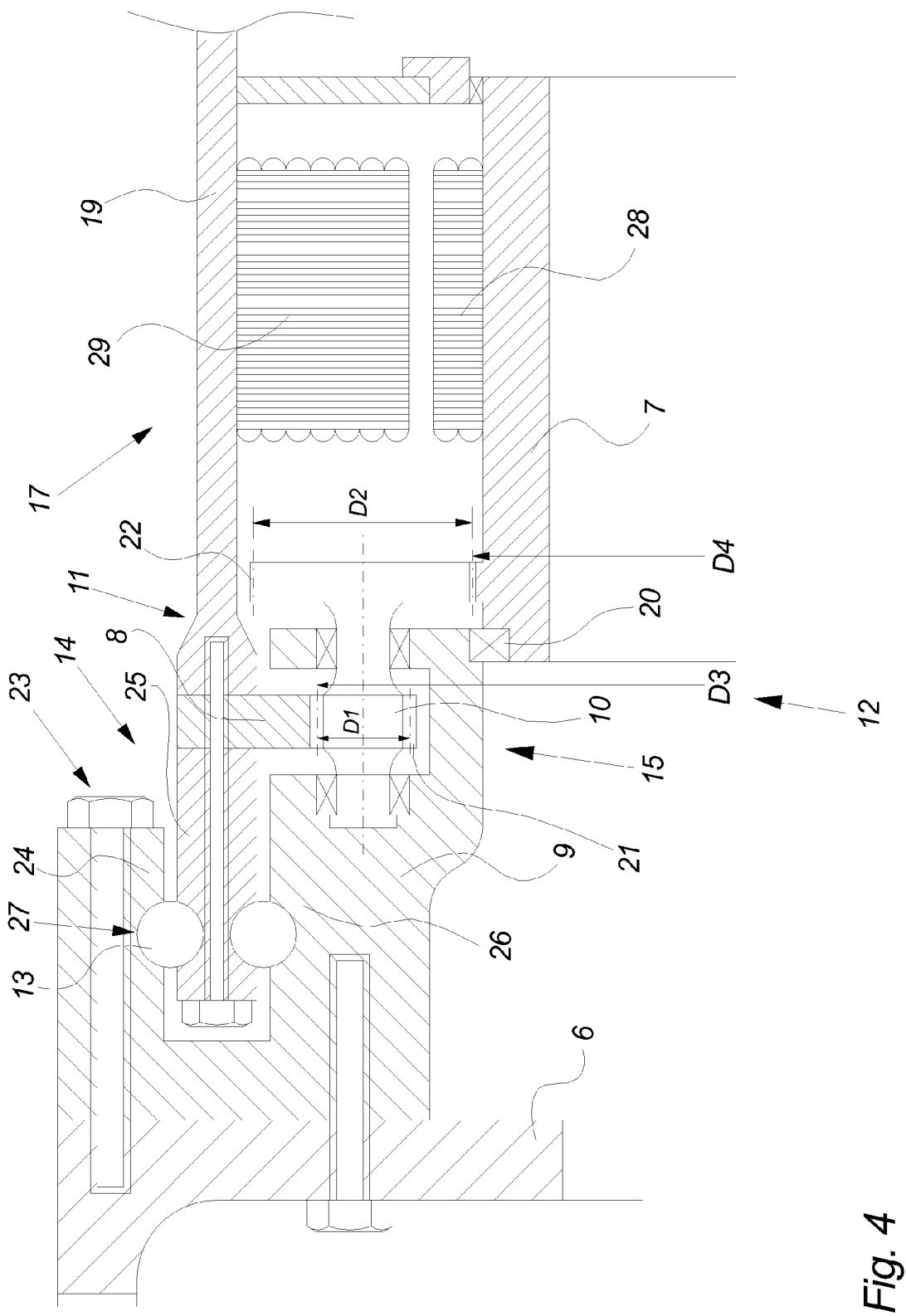
FIG. 4 illustrates a cross section of a part of an embodiment of a drive train according to the invention comprising one planetary gear stage, as seen from the side.

FIG. 4 illustrates a cross section of a part of an embodiment of a drive train 12 according to the invention comprising one planetary gear stage 11, as seen from the side.

In this embodiment of the invention, the drive train 12, which comprises a main bearing 14, a epicyclical gearbox 15 and a generator 17, is more or less integrally built to form a hollow annular structure.

The main bearing 14 is in this embodiment a locally radial self tracking bearing 23 where the inner ring 26 and the outer ring 24 are formed as a part of the planet carrier 9 of the gearbox 15.

In this embodiment, the planet carrier 9 and thereby the inner ring 26 and the outer ring 24 are connected to the rotor 4 through the outer peripheral edge of the hub 6, but in another embodiment the centre ring 25 could be connected to the rotor 4, or the inner 26 and outer ring 24 or the centre ring 25 could be connected to a shaft being connected to the rotor 4.

In this embodiment, the centre ring 25 is directly connected to the annulus gear 8 of the gearbox 15 which then again is directly connected to a load carrying structure 19 of the nacelle 3 but in another embodiment the configuration of how the locally radial self tracking bearing 23, the epicyclical gearbox 15 and the generator 17 is connected could of course vary in a multitude of different embodiments within the scope of the invention.

In this embodiment of the invention, the gear stage 11 of the epicyclical gearbox 15 is with a large diameter annulus gear 8 and small diameter planets 10, hence the sun gear 7 is large in diameter D4. Small diameter planets 10 orbiting a large sun 7 allow space for many planets 10; hence the load on each planet 10 is low. The planet load is the torque diverted with the radius of the planet orbit and the number of planets 10. Such a gearbox 15 will have high torque capacity for little weight compared to known gearboxes 15. The downside of this is the low gear ratio of a single gear stage 11. The single planetary stage 11 has gear ratio i=2.times.(D3(annulus gear)/D4(sun gear)). Gearboxes 15 with the sun diameter D4 close to the annulus gear diameter D3 have a gear ratio just over two.

In this embodiment of the invention the planets 10 comprise both a first toothed part 21 and a second toothed part 22 of different diameters D1, D2 whereby the gear ratio can be enhanced in that i=1+(D3/D4)×(D2/D1). The geared planet stage 11 can then provide a gear ratio of 3 to 5. This is substantially the same ratio as the classical planet stages 11 but for less weight.

Figure 5:
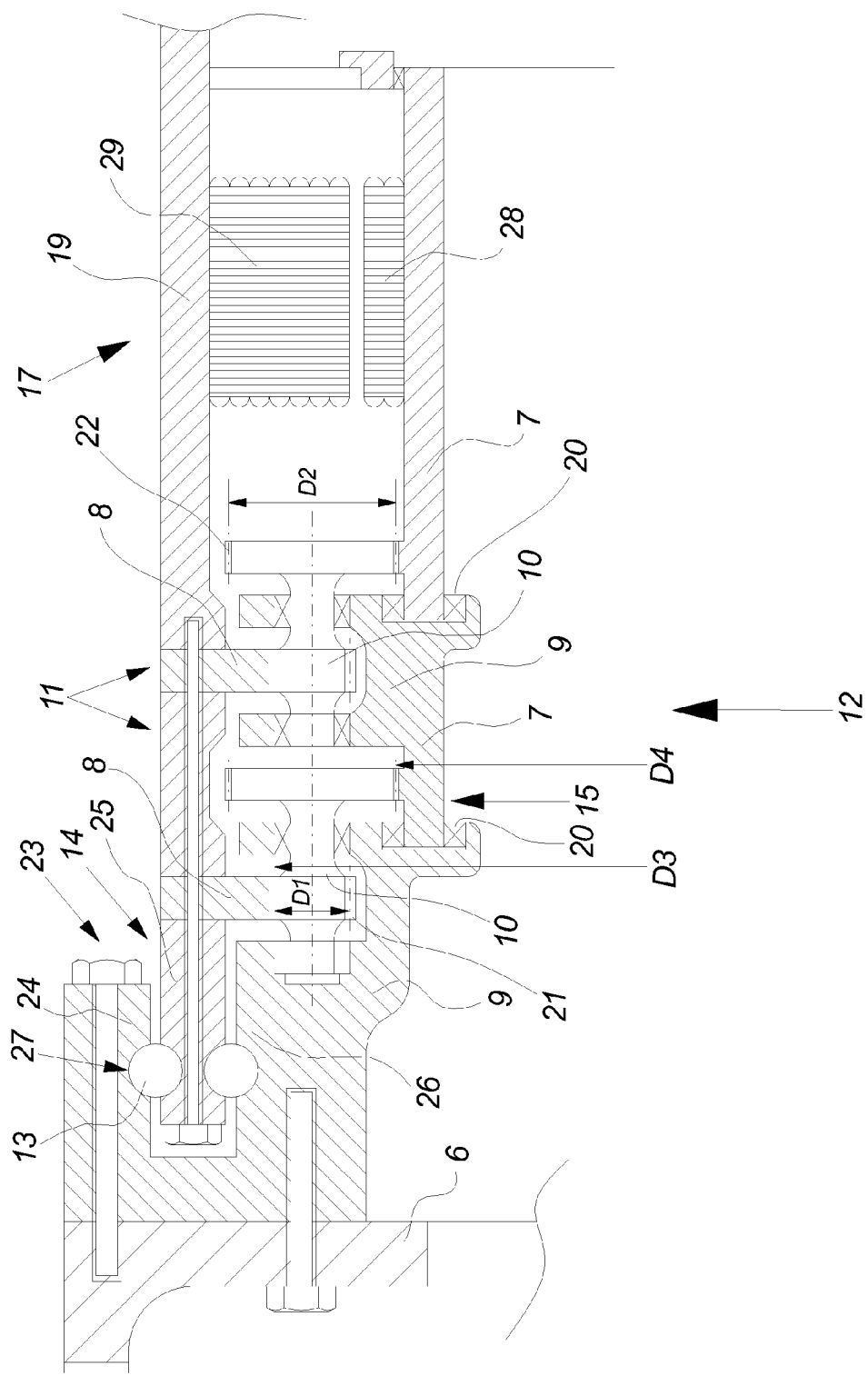
FIG. 5 illustrates a cross section of a part of an embodiment of a drive train according to the invention comprising two planetary gear stages, as seen from the side.

FIG. 5 illustrates a cross section of a part of an embodiment of a drive train 12 according to the invention comprising two planetary gear stages 11, as seen from the side.

In this embodiment a significantly larger gear ratio is requested and a two stage 11 planetary gearbox 15 is therefore provided.

In another embodiment of the invention the gearbox could comprise one or more traditional gear stages 11 comprising planets 10 with only one toothed part or one or more of the gear stages 11 could be of another type such as a helical gear or other.

In this embodiment the hollow planetary gearbox 15 is advantageously built together with the main rotor bearing 14, which in this embodiment is a locally radial self tracking bearing 23, and the generator 17.

The rotor hub 6 and the planet carrier 9 are connected to each other and rotate commonly; hence they can share the same main bearing 14. The sun wheel 7 must have its own bearings 20, which can be inserted in the planet carrier 9.

The planetary gearbox 15 and the main bearing 14 can be built as a unit between the rotor 4 and the nacelle structure 19. In this embodiment the nacelle structure 19 is considered to be tubular with a diameter of e.g. between 1.5 meter and 4.5 meter. The large diameter sun gear 7 is coupled directly to a low speed generator 17. With a tubular nacelle structure 19 at 2-3 meter in diameter, the inside of the structure 19 is ideal for a low speed generator 17. A Megawatt generator 17 with say 40-50 rpm will fit well inside a 2-3 meter tubular structure. Adding another stage 11 to the gearbox 15 will increase the generator speed further and reduce the size of the generator 17.

A large size tubular nacelle structure 19 is load effective in bending. Say a 10 MNm moment take a 2.5 meter in diameter tube 19 with a wall thickness of just 20 millimetres. Such a tube 19 is not particularly stiff against deformation over the diameter. It is therefore important to design the structures to allow some global deformations and to secure local radial tracking in bearings 14, gearbox 15 and generator 17. The appropriate bearing design can provide such tracking even if the structures 19 are flexible to some degree.

The main bearing 14, the gearbox 15 and the generator 17 running in a slightly oval shape is not in itself a problem if the structures are sufficiently flexible and the bearing rings 24, 25, 26, the gear wheels 7, 8, 10 and the air gap in the generator 17 are locally governed correctly. Some stiffening bulkheads may be needed.

The main bearing 14 must be designed not to give a large radial load component e.g. to the nacelle structure 19 from the bending moment. This excludes 2-ring bearings like traditional 4 point contact ball bearings, cross roller and pair of taper bearings. Suitable bearing 14 can be three row 27 roller or triple ring bearings 23.

The bearing 23 illustrated in FIGS. 4 to 12 are all triple ring bearings 23 with only two rows 27 of balls 13, but in another embodiment the bearing 23 could be a 4-point contact ball bearing, cross rollers or even taper bearings where the induced radial forces are neutralized inside the bearing 23.

The planet diameter has to be relatively small for a multiple planet gearbox 15 comprising more than nine planets 10. The size of the planet gears 10 is to some degree determined the planet bearing diameter. The location of the planet bearing is therefore an important factor. If the planet bearing is inside the planets 10, the diameter of the planets 10 is enlarged due to the bearing size. To ensure the extreme long service duration like 20 years—which is normal within the field of wind turbines—the bearings have to be of a significant size. It is therefore not favorable to make the planets 10 enclose the planet bearing or bearings. The planet bearings can therefore advantageously be shaft mounted at the ends of the planets 10 as illustrated in FIGS. 4 to 7.

The concept of having planets 10 comprising to different toothed diameters D1, D2 to enhance the gear ratio is attractive. The larger planet gear diameter D2 determines how many planets 10 can be fitted in each stage 11 due to their mutual spacing. By having the internal spacing at a minimum, the large planet gear diameter D2 must be outside the planet carrier 9. The planet shaft requires a 2-bearing arrangement to govern the planet shaft correctly. They could be placed on each side of the small planet diameter D1. The planet bearing placed between the first toothed part 21 and the second toothed part 22 will take the most of the forces and is hereof the largest of the two planet bearings. This position of the largest planet bearing is fine as it is at the non-drive end of the planet carrier 9. The large planet bearing holes in the planet carrier 9 will not affect the stiffness of the planet carrier 9 largely. This bearing must be mounted in over the small planet diameter D1 or be mounted before an assembly of the first and second toothed part 21, 22. The small planet bearing at the free end of the first toothed part 21 is mostly a guiding bearing and can with advantage be the locating bearing if such is needed.

The multiple planet gearbox 15 with, in other words, 24 planets must be designed to load share evenly between the planets 10. This is already a challenge for a normal three planet gearboxes. With the planet gears comprising two different toothed parts 21, 22 the tolerance between the two gears parts 21, 22 adds to the uncertainty of correct load share. A device to suppress the influences of the tolerances is appropriate here. Best is some flexure, which can compensate for load differences. A device like a torsion flexure between the two planet gears parts 21, 22 will be a proper feature to improve even loading between the numerous planets 10. Designs like long shafts or flexible spokes in the hub of the large planet gear part 22 can be a solution to better compliance between the planets 10.

The flexible spokes is a very attractive solution as it does not involve a joint between the two gears parts 21, 22 and does not add to the length of the gear stage 11. The spokes can be made by machining the intermediate material away in the hub of the planet gear wheel 10. The shape and the length of the spokes determine the flexure. Stress calculations must be carefully done in order not to get into fatigue problems. Finite element analysis is a valid tool to optimize the design of the spokes. The torsion flexure is not meant to be large but large enough to compensate for variations in the accurately of machining the gears 10 and the alignment.

If a gear ratio of approximately four, as it substantially is in a gearbox 15 as illustrated in FIG. 4, is too little to satisfy the requirement of rotation speed for the generator 17, the gearbox 15 must have another stage 11 to speed up further.

Such additional stage 11 can be an ordinary planetary stage 11 for doubling the speed or a geared planet stage as the planet stage illustrated in FIG. 4 for up to 4 times speed increase.

If the rotor 4 speed of a large modern wind turbine 1 was approximately at 13 rpm, different embodiments of gearboxes 15 offers the following generator 17 speeds:

| | |
|---|---|
| Single non-geared planet stage: | Generator at 27 rpm. |
| Single geared planet stage: | Generator at 50 rpm |
| Single non-geared stage + geared stage: | Generator at 100 rpm |
| Two stages with geared planets: | Generator at 200 rpm. |

The gearbox 15 choice must be validated together with the generator 17 sizing. Two stage 11 gearboxes 15 add cost to the gearbox 15 and reduce the cost of the generator 17. The optimum of this can, for example, be calculated by estimating system cost for the various solutions for a specific wind turbine 1 type.

An example of a gearbox for a large modern 3 MW wind turbine 1 comprising a rotor rotating at 13 rpm could have approximately the following dimensions:

Annulus gear 8: pitch diameter D3 2620 mm, module 10, width 120 mm.

Planet 10 orbit diameter: 2480 mm

First toothed part 21: Outer diameter D1 160 mm, 120 mm long

Second toothed part 22: Outer diameter D2 320 mm, 70 mm long

Number of planets 10: 24

Sun gear 7: Pitch diameter D4 2176 mm

Gear ratio: 1:3.6

Generator 17 velocity: 47 rpm

The weight of such a single stage gearbox 15 with geared planets 10 will weigh approximately six metric tons and the main bearing 14 will weigh approximately two metric tons. Say the gearbox 15 bearing weight is approximately eight metric tons. Adding another stage 11 to the gearbox 15 adds approximately three metric tons of weight for a total of 11 metric tons. This is to be compared with the twenty-three metric ton heavy gearbox 15 and main bearing 14 units a traditional 3 MW wind turbine 1 is equipped with.

The generators 17 mass can be estimated to fifty metric ton for a 50 rpm-3 MW generator 17 and fourteen metric ton for a 200 rpm-3 MW. The 50 rpm system seems not attractive due to the high mass of the generator 17 but could be advantageous due lower cost of gearbox, smaller size of gearbox, lower weight of gearbox, better access to gearbox parts or other. The 200 rpm generator seems attractive as its weight is thirty-six metric ton less and requires just three metric ton for the additional gear stage 11.

The design with the gears 7, 8, 10 directly mounted up to the nacelle structure 19 and the main bearing 14 give the gearbox 15 noise almost direct passage to the rotor 4 and the nacelle structure 19. An engineering task will be to mute the gear noise. Both modifications of the gear profiles to reduce the sound introduction and to dampening the structural noise are possible tasks areas.

The cooling of the gearbox 15 and generator 17 is less problematic as the surface area is larger per lost power. Forced cooling will properly still be needed.

The inertia of the rotating parts is reduced seen from the rotor 4. The higher generator rotor weight and distance to centre give a high moment of inertia for the rotating part of the generator 17. However seen from the rotor end of the drive train 12 the rotating inertia is only half of the current generator 17 inertia seen thru the gears. The new system has less gear load due to acceleration of the rotor 4.

The hollow epicyclical gearbox 15 offers a compact light weight and compact speed up unit, which can be integrated together with a main bearing 14 and a medium speed generator 17. Such unit can be made in dimensions no larger than current nacelle sizes for the same wind turbine type 1. Say a large modern 3 MW wind turbine 1 could fit within the same nacelle 3 cower size. The weight of main bearing 17 and gearbox 15 is approximately half of the current gearbox and the medium speed generator 17 is approximately twice as heavy. The nacelle 3 weight for a drive train comprising main a locally radial self tracking bearing 23, a two stage 11 geared planet gearbox 15 and a medium speed generator 17 is therefore substantially the same level as current nacelles 3.

The drive train 12 is simplified compared with traditional drive trains 12 as no coupling is present between gearbox 15 and generator 17. The inertia forces between rotor 4 and generator 17 is reduced to approximately 50% so acceleration moments through the gearbox 15 are reduced. The design is hollow in the centre with a diameter of e.g. 2 meter for a 3 MW drive train 12. This gives space to enter the hub 6 from the nacelle 3 side thru an opening in the centre of the hub 6.

The open structure in the centre opens up for the possibility to service/repair the drive train 12 from the inner. The possibility to in situ replace critical parts of the main bearing 14, planet gears 10, bearings, coils in the generator 17 or other components is within reach of this design and the design is increasingly attractive the larger the turbine 1 get.

Figure 6:
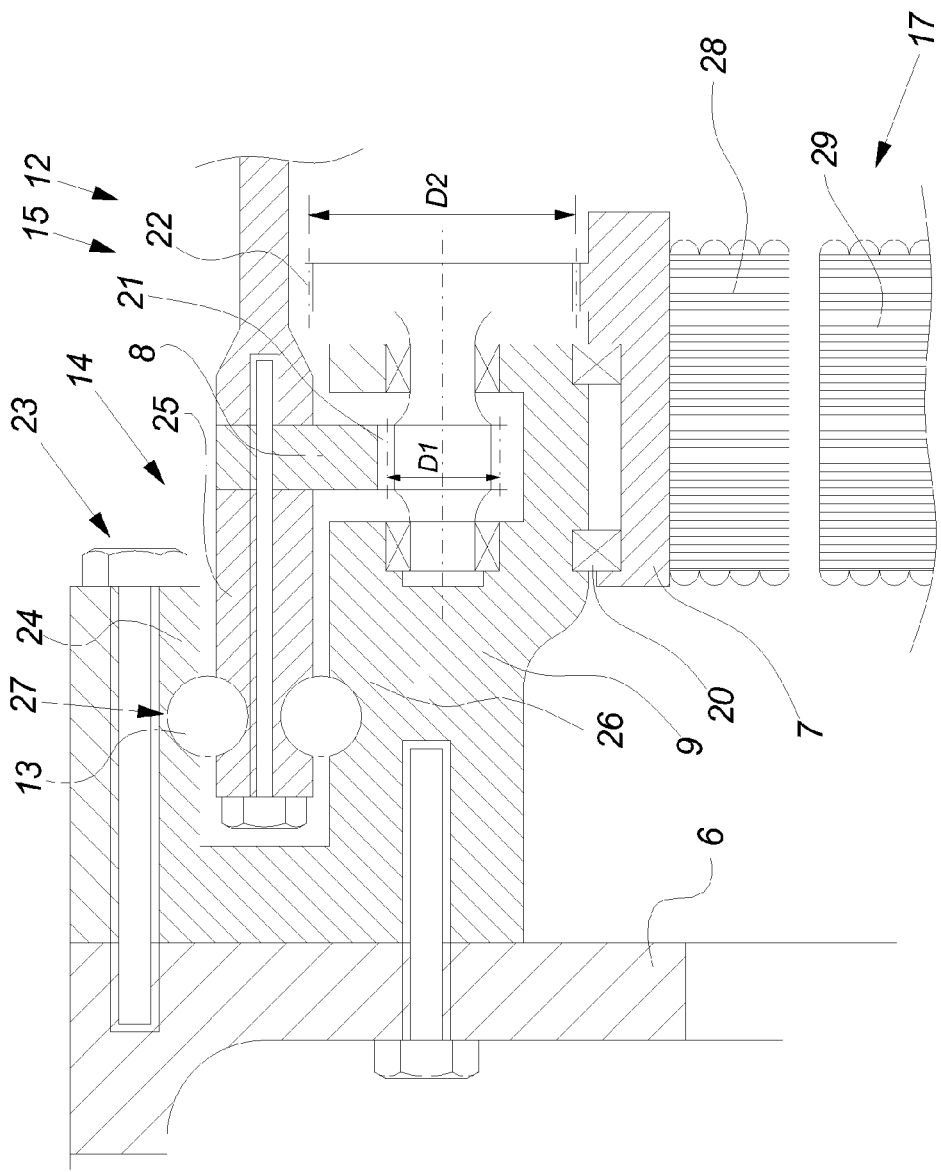
FIG. 6 illustrates a cross section of a part of an embodiment of a drive train according to the invention wherein the gearbox substantially encloses the generator, as seen from the side.

FIG. 6 illustrates a cross section of a part of an embodiment of a drive train 12 according to the invention wherein the gearbox 15 substantially encloses the generator 17, as seen from the side.

In this embodiment of the invention the rotor part 28 of the generator 17 is placed on the inside of the sun gear 7 to make the rotor part 28 rotate around the outside of a stationary stator part 29.

In this embodiment the stator part 29 is solid but in another embodiment the stator part 29 could be hollow enabling access to the hub 6 through the centre of the stator part 29 and the rest of the drive train 12.

The lay-out of a drive train 12 as illustrated in FIG. 6 provides for a very compact design where the total length of the drive train 12 is very little. Furthermore this design provides for easy access to the internal parts of the gearbox 15 such as the planet gear 10, planet bearings and other.

Figure 7:
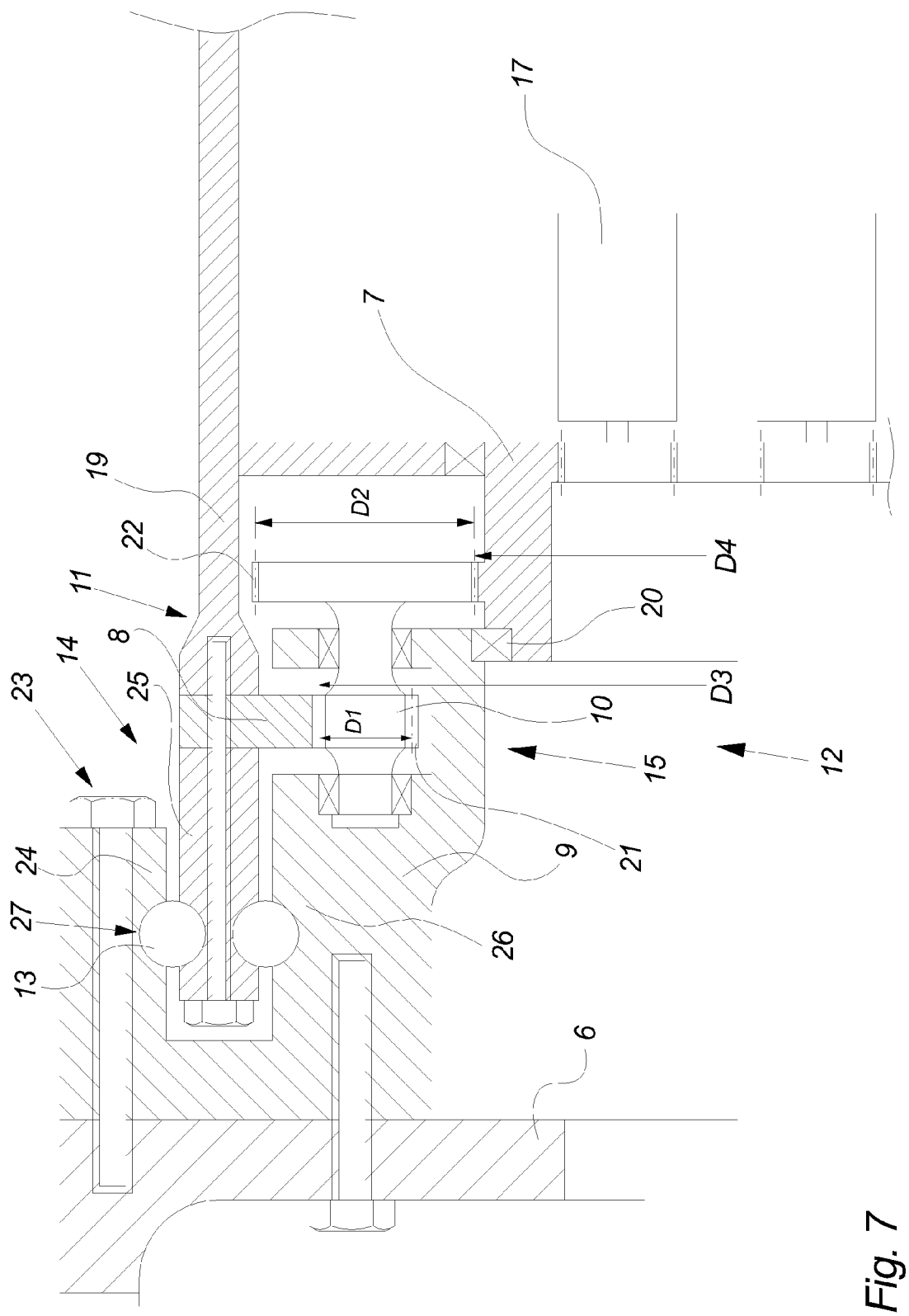
FIG. 7 illustrates a cross section of a part of an embodiment of a drive train according to the invention comprising more than one generator, as seen from the side.

FIG. 7 illustrates a cross section of a part of an embodiment of a drive train 12 according to the invention comprising more than one generator 17, as seen from the side.

In this embodiment of the invention the drive train 12 is provided with six individual and separate generators 17 but in another embodiment the drive train 12 could be provided with another number of generators 17. Because of the location of the cross section only two of these six generators 17 are present in FIG. 7.

In this embodiment the generators 17 are provided with a gear on their input shafts. This gear mesh with teeth of the sun gear 7 to provide an additional increase in the rotation speed.

Figure 8:
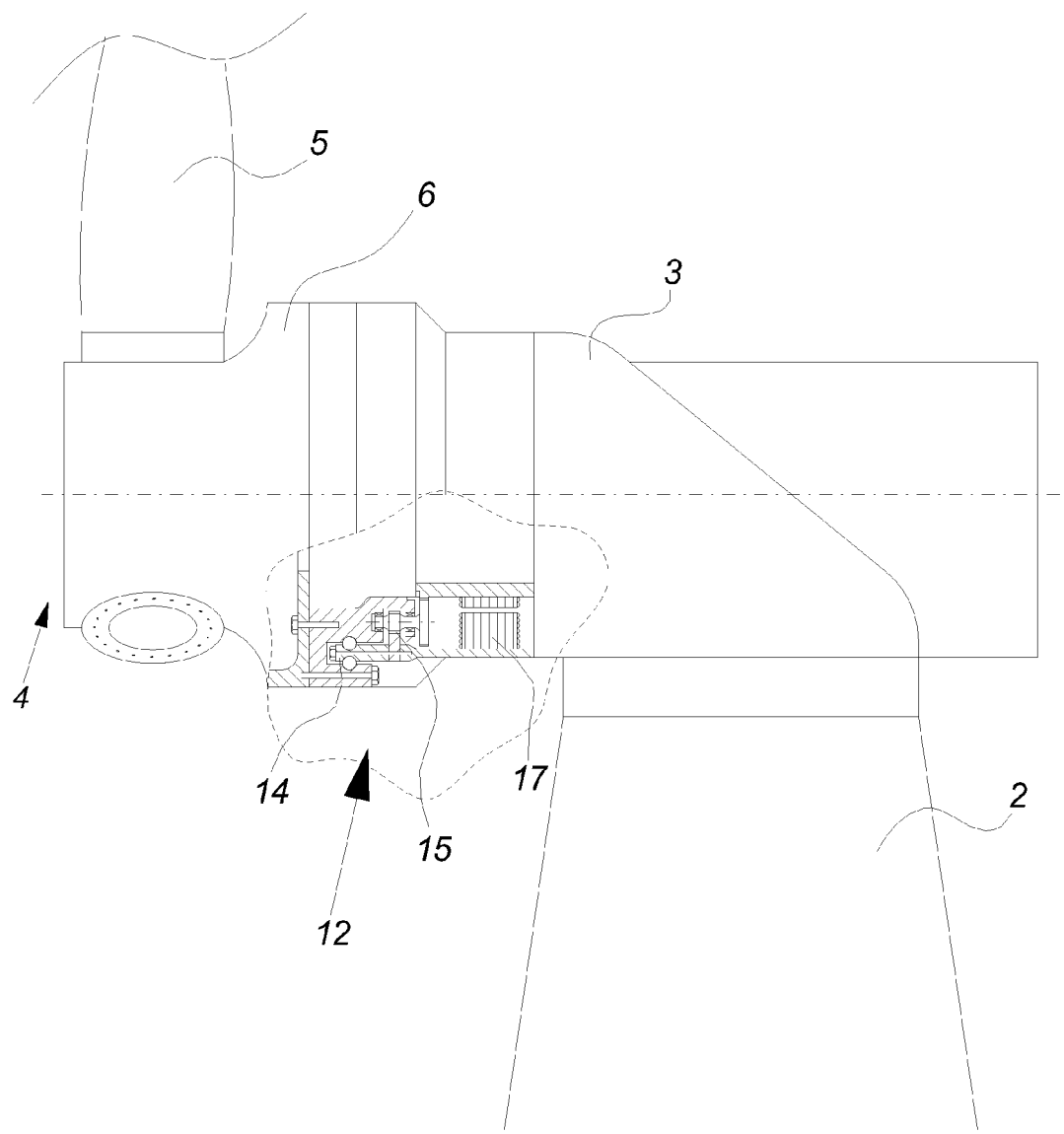
FIG. 8 illustrates a cross section through a part of a wind turbine nacelle, as seen from the side.

FIG. 8 illustrates a cross section through a part of a wind turbine nacelle 3, as seen from the side.

The present drive train 12 design enables a very compact design of the nacelle 3 and particularly of the strengthening structure 19 of the nacelle 3. Actually the nacelle structure 19 is substantially reduced to a tubular shell running from the main bearing 14 to the yaw mechanism at the tower 2.

FIG. 8 further illustrates that the main bearing 14, the gearbox 15 and the generator 17 are all placed on approximately the same diameter, which in this case is approximately the same as the peripheral diameter of the hub 6.

Figure 9:
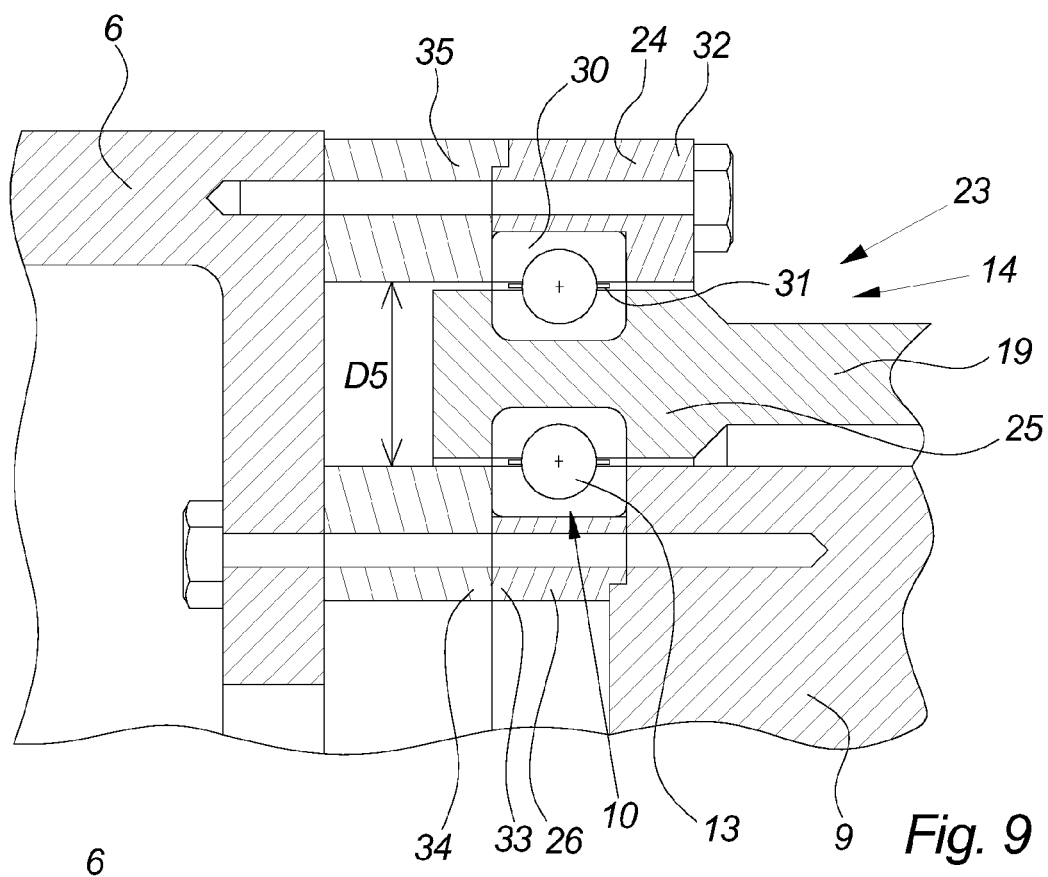
FIG. 9 illustrates a part of a cross section of an embodiment of a locally radial self tracking bearing mounted in the drive train of a wind turbine, as seen from the side.

FIG. 9 illustrates a part of a cross section of an embodiment of a locally radial self tracking bearing 23 mounted in the drive train 12 of a wind turbine 1, as seen from the side.

In this embodiment of the invention the inner ring 26 and the outer ring 24 of the locally radial self tracking bearing 23 is rigidly connected to the wind turbine hub 6 by means of attachment means which in this case is bolts.

In another embodiment the inner ring 26 and the outer ring 24 could be connected to another part such as the strengthening structure 19 of the nacelle, the wind turbine gearbox 15, a part of the gearbox 15 such as the planet carrier 9, the annulus gear 8 or to any other part either on the rotor 4 or on the nacelle 3 or either both or one of the inner ring 26 and the outer ring 24 could entirely or partly be formed integrally with the hub 6, the strengthening structure 19 of the nacelle, the gearbox 15 or any other part of the rotor 4 or the nacelle 3 or the inner ring 26 and the outer ring 24 could be formed as a single, for example, U-shaped part where the two "legs" in the U would be the inner ring 26 and the outer ring 24 of the main bearing 14 being integrally joined by a cross-part.

In this embodiment, the inner ring 26 and the outer ring 24 are connected to the same part but in another embodiment the rings 24, 26 could be connected to different parts where these different parts then would be rigidly connected.

It is important that the inner ring 26 and the outer ring 24 are rigidly connected to ensure that the internal distance D5 between the inner ring 26 and the outer ring 24 at all times are maintained substantially constant and uniform all the way around the bearing rings 24,25,26 to prevent the rolling elements 13 from leaving their correct position between the rings, for example, by running on the edges of the raceways 30 or other which could damage or reduce the life of the locally radial self tracking bearing 23 or parts thereof. Hereby the operation of the locally radial self tracking bearing 23 is ensured even though the bearing 23 may be deflected, for example, making a specific point on the rotating part of the bearing 23 describe something else than a perfect circle such as an elliptic curve. The operation of the locally radial self tracking bearing 23 is ensured because the inner ring 26 and the outer ring 24 always will keep the centre ring 25 in its right position no matter the direction of the load (radial in or outwards, axially forward and back or any combination hereof) the locally radial self tracking bearing 23 has to transfer. The bearing 23 hereby becomes self-tracking in that the center ring 25 at all times is guided substantially precisely between the inner ring 26 and the outer ring 24 substantially no matter if the bearing 23 is slightly oval or other.

In this embodiment of the invention the wind turbine 1 does not have a low speed shaft as such, in that the rotor 4 is directly connected to the planet carrier 9 of the epicyclic gearbox establishing the connection between the rotor 4 and the nacelle 3 along the outer edge of the hub flange 27, making the main bearing 14 have a relative large diameter such as between 1 and 5 meters, preferably between 1.8 and 3.5 meters. FIG. 9 to 12 therefore illustrates a cross section of one side of the main bearing 14 at the upper side of the nacelle 3 at a distance of e.g. 1.2 meters from the rotational axis of the rotor 4, making the diameter of this embodiment of a main bearing 14 according to the invention approximately 2.4 meters in diameter.

In another embodiment of the invention the main bearing 14 could be placed at another diameter e.g. by enclosing a smaller diameter main shaft or other.

In this embodiment the main bearing 14 only comprises one centre ring 25, one outer ring 24 (even though this outer ring 24 is divided into more than one juxtaposed ring parts 32, 35) and one inner ring 26 (even though this inner ring 26 is divided into more than one juxtaposed ring parts 33, 34) but in another embodiment the main bearing 14 could comprise more than one of each of these rings 24, 25, 26.

In this embodiment of the invention the centre ring 25 is formed as one single ring but in another embodiment the centre ring 25 could also be formed as a number of concentric rings such as two individual rings each mounted substantially on the same wind turbine part such as on the hub 6 or on a part of the nacelle 3 such as a part of the gearbox 15. The centre rings 25 just have to be rigidly connected to ensure that the locally radial self tracking bearing 23 is capable of efficiently transferring load in both radial directions.

In this embodiment of the invention the centre ring 25 is formed integrally with the strengthening structure 19 of the nacelle 3 but in another embodiment the centre ring 25 could be a separate part connected rigidly to or at least substantially rigidly to the strengthening structure 19 of the nacelle 3 or another more or less stationary or rotating part of the nacelle 3 or if the inner ring 26 and outer ring 24 was connected to the nacelle 3 the centre ring 25 could be connected to the rotor 4 for example, via the hub flange 27.

In this embodiment of the invention the three-ring design could also be used for evening out the abrasion of the stationary ring or rings 24, 25, 26 and/or the abrasion of the raceway 30 of the stationary ring or rings 24, 25, 26. The stationary raceways 30 in such an arrangement (those mounted to the nacelle 3) will see a predominant load direction due the rotor's 4 own weight, and the tilt moment resulting from the blade's 5 own weight. This will cause a higher rate of fatigue and wear in certain regions of the stationary ring or rings. For example, if one now chooses to mount the inner ring 26 and outer ring 24 to the stationary nacelle structure 19, and the center ring 25 to the rotating part (hub 6), then these regions of increased fatigue and wear will occur in defined areas of these stationary rings 24, 26. Now, one may execute the locally radial self tracking bearing 23 such that either the inner ring 26 or the outer ring 24 can support the rotor 4 alone, at least in static conditions. This means that one could design the main bearing unit 14 such that one removes the attachment means of the outer ring 24, rotates the outer ring 24 for example, 180 degrees, reattach the outer ring 24, then removes the attachment means of the inner ring 26, rotates this by, for example, 180 degrees and reattach the inner ring 26 by means of the attachment means. This means that the higher loaded bearings rings 24, 25, 26 after some share of their lifetime will continue to run on the hereto unloaded area. In essence, one can design each contact just for a fraction of the system design lifetime.

In this embodiment of the invention, the bearing rings 24, 25, 26 are all substantially perfectly round when initially mounted, but in another embodiment of the invention, the rings 24, 25, 26, could be formed, for example, oval to pre-compensate for static deadweight. The deadweight of the rotor 4 could cause a static offset in vertical direction, and could therefore cause a misalignment of the gearbox 15 or generator 17 towards its mount (nacelle 3 or at least nacelle structure 19). This offset is quite well-defined by the masses of the components 4, and the stiffness of the main bearing 14, and can hence be pre-compensated. Basically, one executes the bearing journals on part "too high", such that they take their theoretical ideal position first when the rotor 4 is mounted. One would probably not only pre-compensate for the static deadweight, but, for example, also for the mean operating load which may be significantly different from just masses, such that only deviations from mean have an impact on gearbox- or generator-alignment.

In this embodiment of the invention, there is a potential risk of some of the rolling elements 13 at some point running in a no-load condition. But rolling element bearings and particularly the illustrated roller bearing 14 are not configured for running unloaded, not even locally around the circumference. Operation with/without load causes the rolling element 13 to run slower than its theoretical speed, and hence slide in the contact zone. Once the rolling element 13 enters the load zone, it first needs to accelerate, and this may cause skidding or smearing which eventually may destroy the main bearing 14. In another embodiment of the invention it could therefore be advantageous to modify the stiffness of bearing rings 24, 25, 26 or at least parts or the bearings 32, 33, 34, 35 to obtain a defined pre-load of the rolling element 13, just enough to maintain a defined minimum roller load under all operating conditions.

In this embodiment of the invention the three-ring design could

Figure 10:
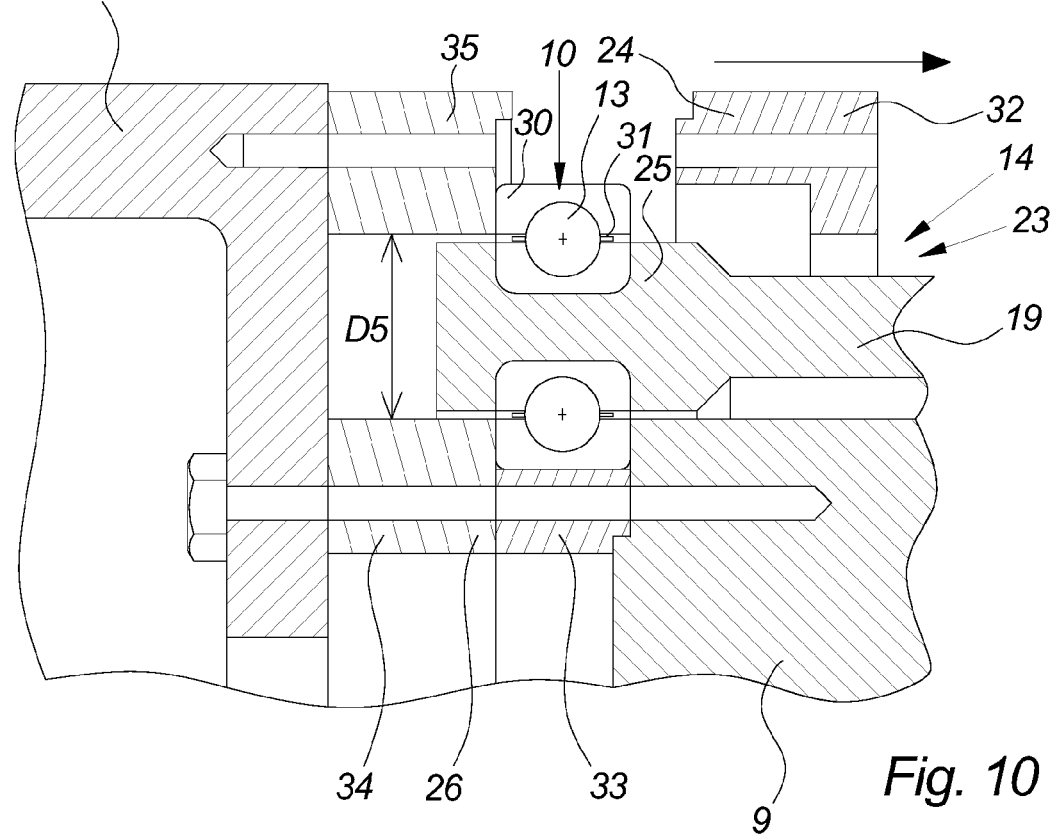
FIG. 10 illustrates the same embodiment as FIG. 9 with a first part of the outer ring axially displaced, as seen from the side.

FIG. 10 illustrates the same embodiment as FIG. 9 with a first part of the outer ring 32 axially displaced, as seen from the side.

The present design of a locally radial self tracking bearing 23 offers further advantages regarding the operation of the wind turbine 1 in that this design enables that the entire main bearing 14 or at least the wearing parts and/or the internal parts 30, 13, 31 of the locally radial self tracking bearing 23 can be accessed, inspected and/or replaced without the rotor 4 having to be removed or fixated by additional complex equipment.

In this embodiment of the invention a first part of the outer ring 32 can be axially displaced to enable access to the internal parts 30, 13, 31 between the outer ring 24 and the centre ring 25.

In that the first part of the outer ring 32 is heavily loaded when radial and/or axially loads are transferred though the main bearing 14 the first part of the outer ring 32 is in this embodiment formed as a single closed ring completely enclosing the internal parts 30,13,31 between the outer ring 24 and the centre ring 25 but in that the inner ring 26 and the outer ring 24 are rigidly connected locally all the way around the main bearing 14 the first part of the outer ring 32 could also be formed as a number of individual segments.

In this embodiment of the invention, the outer ring 24 further comprises a second part of the outer ring 35, which in this embodiment is stationary during the inspection and/or the replacing of the internal parts 30,13,31, but in another embodiment the second part of the outer ring 35 could, for example, be divided into a number of segments and then removed during the inspection and/or the replacing of the internal parts 30,13,31 to ensure better working conditions, or the second part of the outer ring 35 could be formed as an integrated part of the hub 6 or other component.

When the first part of the outer ring 32 has been removed, there is free access to the raceway 30 in the outer ring 24, the rolling elements 13, the cage 31 or cages 31 and the raceway 30 in the centre ring 25.

The locally radial self tracking bearing 23 comprises one or more cages 31 to substantially maintain the individual rolling elements 13 position with respect to the other rolling elements 13 hereby maintaining a substantially constant and uniform distance between the rolling elements 13 all the way around the locally radial self tracking bearing 23.

In this embodiment the cage 31 is formed as a hoop of steel provided with a number of holes corresponding to the rolling elements 13. The cage 31 is further formed as one segment in that the hoop can be opened in one place to remove the cage 31 without having to remove the rolling elements 13.

In another embodiment the cage 31 could be divided into a number of segments or the cage 31 could be formed as two individual cages 31 running on either side of the rolling elements 13 and then connected between all or some of the rolling elements 13.

While the internal parts 30, 13, 31 between the outer ring 24 and the centre ring 25 is removed or just accessed the rolling elements 13 between the centre ring 25 and the inner ring 26 are maintained fully operational hereby enabling that the row or rows 27 of rolling elements 13 between the centre ring 25 and the inner ring 26 can carry the entire weight and load of the rotor 4 and transfer it to the nacelle 3 and further on.

The rotation of the rotor 4 would of course have to be stopped before any of the rings 24,25,26 are dismantled or removed to ensure the safety of the personnel doing the repairs, to ensure the safety of the machinery and to reduce the load having to be transferred through the main bearing 14 during the repairs.

Figure 11:
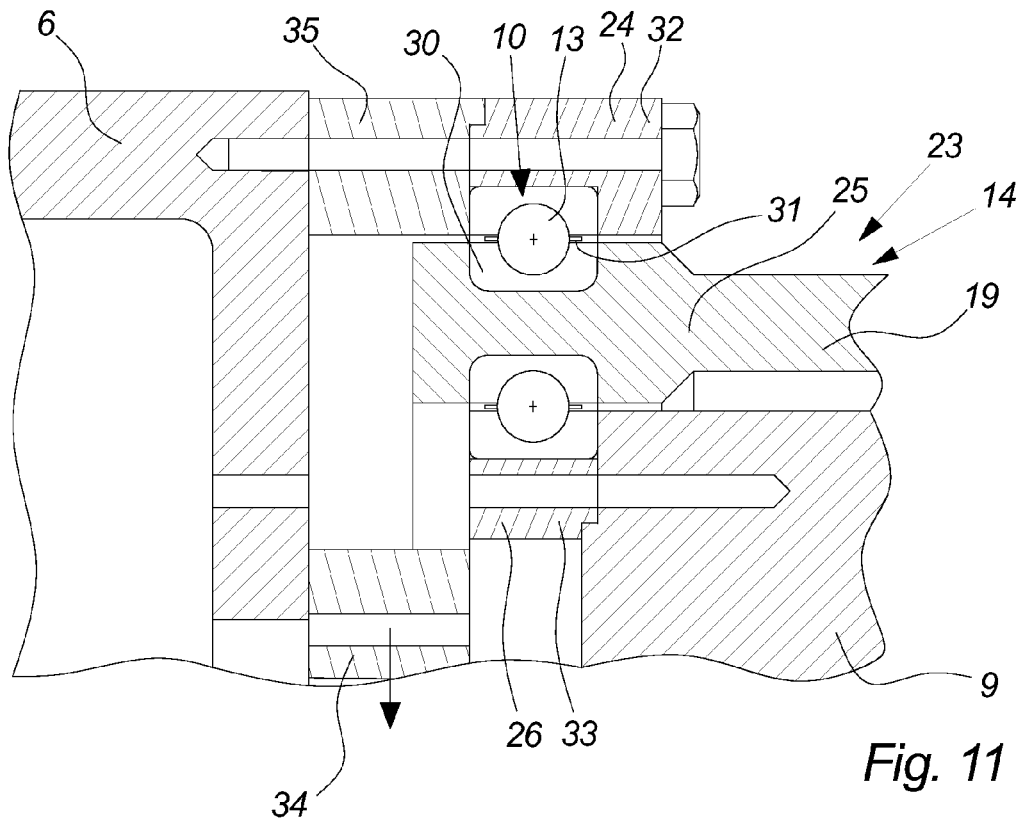
FIG. 11 illustrates the same embodiment as FIG. 9 with a first part of the inner ring radial displaced, as seen from the side.

FIG. 11 illustrates the same embodiment as FIG. 9 with a first part of the inner ring 33 radially displaced, as seen from the side.

Because of the design of the locally radial self tracking bearing 23 in this embodiment of the invention the first part of the inner ring 33 can not be removed before the second part of the inner ring 34 has been moved.

In this embodiment of the invention the first part of the inner ring 33 is formed as a full closed ring and therefore has to be moved axially but in another embodiment of the invention the first part of the inner ring 33 could be divided into a number of segments which could be removed radial.

In that the second part of the inner ring 34 in this embodiment is axially stuck between the hub flange 27 and the first part of the inner ring 33 the second part of the inner ring 34 is in this embodiment of the invention divided into a number of segments which can be removed radially.

Figure 12:
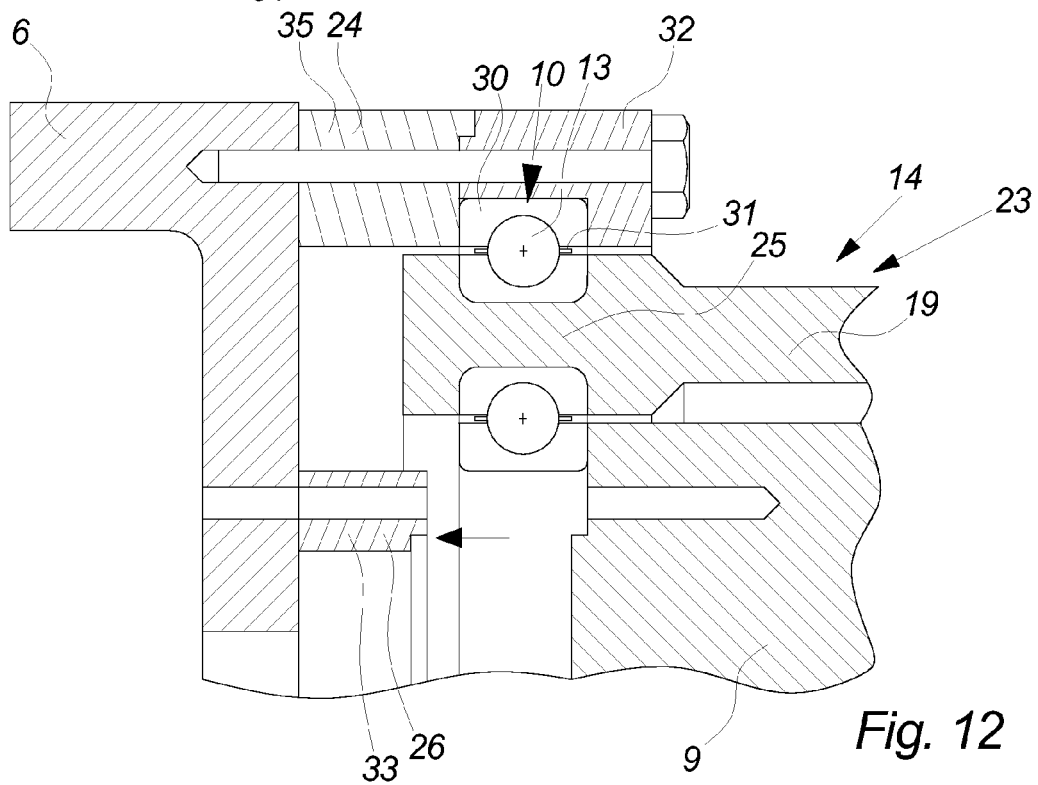
FIG. 12 illustrates the same embodiment as FIG. 9 with a second part of the inner ring axially displaced, as seen from the side.

FIG. 12 illustrates the same embodiment as FIG. 9 with a second part of the inner ring 34 axially displaced, as seen from the side.

Once the second part of the inner ring 34 has been moved the first part of the inner ring 33 can be axially displaced to render access to the internal parts 30, 13, 31 between the inner ring 26 and the centre ring 25.

When the first part of the inner ring 33 has been removed there is free access to the raceway 30 in the inner ring 24, the rolling elements 13, the cage 31 or cages 31 and the raceway 30 in the centre ring 25.

In this embodiment of the invention all four raceways 30 are divided into segments for easy removal and to enable that only a damaged part of the raceway 30 was removed.

In another embodiment of the invention only the raceway 30 in the centre ring 25 would be divided into segments whereas the raceways 30 in the inner ring 26 and outer ring 24 would be divided axially immediately over the highest point of the rolling elements 13 into two full separate rings, for example, connected by bolts to form a full raceway 30. If the cages 31 could be mounted after the raceways 30 have been positioned around the rolling elements 13, the raceways 30 in the inner ring 26 and outer ring 24 could also be formed as full circle rings.

In another embodiment of the invention the rings 24, 25, 26 are not provided with separate raceways 30 or at least only the centre ring 25 is provided with separate raceways 30 in that the raceways 30 could be formed integrally with the rings 24, 25, 26 resulting in that the entire rings 24, 25, 26 or at least the entire parts of the rings making contact with the rolling elements 13 would have to be exchanged in case of damage or wear to the raceway 30.

As previously explained, the rolling elements 13 between the centre ring 25 and the outer ring 24 remains load-transmitting while the internal parts 30, 13, 31 between the inner ring 26 and the centre ring 25 are removed or just accessed hereby enabling that the row or rows 27 of rolling elements 13 between the centre ring 25 and the outer ring 24 can carry the entire weight and load of the rotor 4 and transfer it to the nacelle 3 and further on.

The invention has been exemplified above with reference to specific examples of designs and embodiments of drive trains 12, epicyclical gearboxes 15, main bearings 14 and other. However, it should be understood that the invention is not limited to the particular examples described above but may be designed and altered in a multitude of varieties within the scope of the invention as specified in the claims.

What is claimed is:

1. A wind turbine with a drive train placed partly or entirely in a nacelle of said wind turbine, the drive train comprising:
    an epicyclical gearbox including at least one gear stage comprising a plurality of planet gears meshing with at least one of a sun gear and an annulus gear, the gearbox operating to speed-up the rotation of a rotor of the wind turbine, as applied to at least one generator of the wind turbine; and
    at least one locally radial self tracking bearing for enabling rotation of the rotor in relation to a nacelle structure of the nacelle, wherein the locally radial self tracking bearing comprises bearing elements that locally transfer loads in both radial directions between one or more bearing rings directly or indirectly connected to the rotor and one or more bearing rings directly or indirectly connected to the nacelle structure.

2. The wind turbine according to claim 1, wherein a pitch diameter of the sun gear is bigger than between 30% and 99% of a pitch diameter of the annulus gear.

3. The wind turbine according to claim 1, wherein the at least one gear stage comprises between 2 and 100 planet gears.

4. The wind turbine according to claim 1, wherein one or more of the planet gears comprises a first toothed part having a first pitch diameter and a second toothed part having a second pitch diameter, and wherein the first pitch diameter is different from the second pitch diameter.

5. The wind turbine according to claim 1, wherein the at least one locally radial self tracking bearing is a main bearing of the wind turbine.

6. The wind turbine according to claim 1, wherein the at least one locally radial self tracking bearing is integrated in or directly connected to the epicyclical gearbox.

7. The wind turbine according to claim 1, wherein the annulus gear is divided into two or more segments.

8. The wind turbine according to claim 1, wherein the at least one generator comprises at least one rotor part rotating in relation to the nacelle structure and at least one stator part being in substantially stationary relation to the nacelle structure during normal operation of the wind turbine.

9. The wind turbine according to claim 8, wherein the at least one rotor part radially surrounds the at least one stator part.

10. The wind turbine according to claim 1, wherein the drive train further comprises a hollow centre through the entire drive train along an axis of rotation.

11. The wind turbine according to claim 10, wherein the hollow centre is of a size such that it provides personnel access through the entire drive train.

12. The wind turbine according to claim 1, wherein the locally radial self tracking bearing comprises at least one outer ring, at least one centre ring and at least one inner ring, and wherein the centre ring is capable of rotation in relation to the outer ring and the inner ring, or the outer ring and the inner ring are capable of rotation in relation to the centre ring.

13. The wind turbine according to claim 12, wherein the at least one outer ring and the at least one inner ring are rigidly connected.

14. The wind turbine according to claim 12, wherein the at least one outer ring and the at least one inner ring are attached to a hub of said rotor.

15. The wind turbine according to claim 13, wherein the at least one centre ring is connected to a stator part of the at least one generator.

16. A wind turbine with a drive train placed partly or entirely in a nacelle of said wind turbine, the drive train comprising:
    an epicyclical gearbox including at least one gear stage comprising a plurality of planet gears meshing with at least one of a sun gear and an annulus gear, the gearbox operating to transfer and speed-up the rotation of a rotor of the wind turbine, as applied to at least one generator of the wind turbine; and
    at least one locally radial self tracking bearing for enabling rotation of the rotor in relation to a nacelle structure of the nacelle, wherein the locally radial self tracking bearing locally transfers loads in both radial directions between one or more bearing rings connected to the rotor and one or more bearing rings connected to the nacelle structure,
    wherein the locally radial self tracking bearing includes at least one first bearing element located between the one or more bearing rings and configured to locally transfer radially outwardly directed forces from the one or more bearing rings connected to the rotor to the one or more bearing rings connected to the nacelle structure, and the locally radial self tracking bearing includes at least one second bearing element located between the one or more bearing rings and configured to locally transfer radially inwardly directed forces from the one or more bearing rings connected to the rotor to the one or more bearing rings connected to the nacelle structure.

* * * * *